D. Fasig,
Lifting Jack.
№ 83,947.  Patented Nov. 10, 1868.
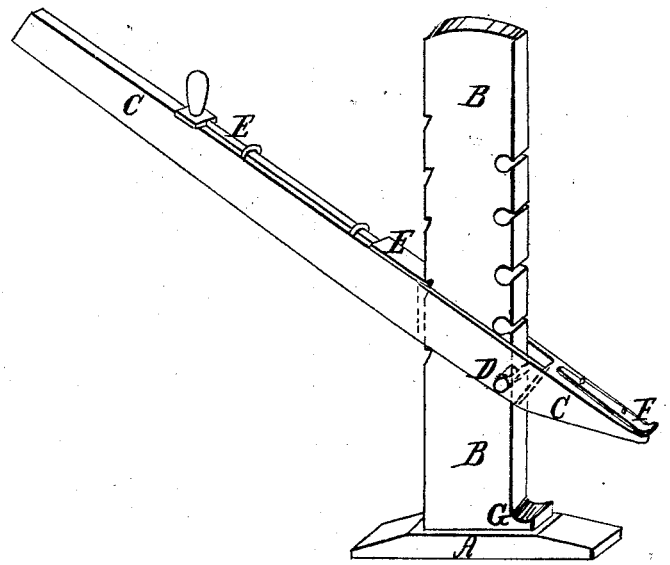
Witnesses;
Wm A Morgan
G C Cotton
Inventor;
Dan'l Fasig
per Munn & Co
Attorneys

DANIEL FASIG, OF ROWSBURG, OHIO.

Letters Patent No. 83,947, dated November 10, 1868.

IMPROVED LIFTING-JACK AND CANT-HOOK.

The Schedule referred to in these Letters Patent and making part of the same.

*To all whom it may concern:*

Be it known that I, DANIEL FASIG, of Rowsburg, in the county of Ashland, and State of Ohio, have invented a new and useful Improvement in Combined Lifting-Jacks and Cant-Hooks; and I do hereby declare that the following is a full, clear, and exact description thereof, which will enable others skilled in the art to make and use the same, reference being had to the accompanying drawings, forming part of this specification, in which the figure is a perspective view of my improved machine.

Similar letters of reference indicate like parts.

My invention has for its object to furnish a simple and convenient machine for raising and turning or canting timber, and which shall be so constructed and arranged that it may be easily adjusted to timber of any size.

It consists in the construction and combination of the various parts, as hereinafter more fully described.

A is the base-block of the machine, which is made sufficiently long and broad to furnish a stable foundation to the machine.

To the middle part of the base, A, is securely attached the lower end of the post or standard B.

C is the lever, which is slotted near its forward end, to receive the standard B, said slot being made sufficiently long to allow the said lever to have the necessary movement.

D is a pin, passing through the sides of the lever C, near the forward end of the slot in said lever, which said pin is dropped into one or the other of the notches formed in the forward edge or side of the standard B, to serve as a fulcrum in raising the wagon or canting the timber, so that, by simply raising or lowering the lever C upon the standard B, the machine may be adjusted to operate at any desired height.

E is a slide, moving back and forth through keepers upon the upper side of the lever C, Upon the rear edge or side of the standard B are formed notches, into which the forward end of the slide E enters, to lock the lever C, when supporting a wagon.

In turning or canting timber, the slide E is not required.

To the upper side of the forward end of the lever C is attached a bar or plate F, which may be roughened, or have low projections formed upon it, to prevent the axle of the wagon from slipping upon it while being raised and lowered.

Upon the forward end of the bar or plate F is formed a hook, to take hold of the timber to be turned or canted.

At the base of the forward edge of the standard B is formed a hook, G, to be used, when required, in canting timber, but which is not required when the machine is used as a lifting-jack.

Having thus described my invention,

I claim as new, and desire to secure by Letters Patent—

The combination of the hook G, on the lower part of the forward edge or side of the standard B, with the slotted adjustable lever C, substantially as herein shown and described, and for the purpose set forth.

DANIEL FASIG.

Witnesses:
SOLOMON HOHENSHIL,
HARRY McHOSE.